United States Patent
Kobayashi

(10) Patent No.: US 9,606,798 B2
(45) Date of Patent: *Mar. 28, 2017

(54) VLIW PROCESSOR, INSTRUCTION STRUCTURE, AND INSTRUCTION EXECUTION METHOD

(71) Applicant: Renesas Electronics Corporation, Tokyo (JP)

(72) Inventor: Yuki Kobayashi, Tokyo (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/989,647

(22) Filed: Jan. 6, 2016

(65) Prior Publication Data

US 2016/0117168 A1    Apr. 28, 2016

Related U.S. Application Data

(63) Continuation of application No. 13/686,828, filed on Nov. 27, 2012, now Pat. No. 9,250,898.

(30) Foreign Application Priority Data

Nov. 30, 2011    (JP) .................................. 2011-262706

(51) Int. Cl.
*G06F 9/00* (2006.01)
*G06F 9/44* (2006.01)
(Continued)

(52) U.S. Cl.
CPC ...... *G06F 9/30029* (2013.01); *G06F 9/30021* (2013.01); *G06F 9/30094* (2013.01); *G06F 9/3853* (2013.01); *G06F 9/3885* (2013.01)

(58) Field of Classification Search
None
See application file for complete search history.

(56) References Cited

U.S. PATENT DOCUMENTS 5,659,722 A    8/1997    Blaner et al.
6,041,399 A    3/2000    Terada et al.
(Continued)

FOREIGN PATENT DOCUMENTS

JP    7-302199 A    11/1995
JP    10-027102 A    1/1998
(Continued)

OTHER PUBLICATIONS

U.S. Notice of Allowance dated Sep. 24, 2015 in U.S. Appl. No. 13/686,828.
(Continued)

*Primary Examiner* — Michael Sun
(74) *Attorney, Agent, or Firm* — McGinn IP Law Group, PLLC

(57) ABSTRACT

A processor, includes a first comparison operation unit; a second comparison operation unit; a first operation unit; a second operation unit; a third operation unit; and a register, wherein the first comparison operation unit receives a first comparison operation signal, a first input signal, and a second input signal, performs a comparison operation indicated by the first comparison operation signal on the first input signal and the second input signal, and outputs a result of the comparison operation, the second comparison operation unit receives a second comparison operation signal, a third input signal, and a fourth input signal, performs a comparison operation indicated by the second comparison operation signal on the third input signal and the fourth input signal (Continued)

signal, and outputs a result of the comparison operation, the first operation unit receives the comparison result of the first comparison operation unit.

20 Claims, 19 Drawing Sheets

(51) Int. Cl.
*G06F 9/30* (2006.01)
*G06F 9/38* (2006.01)

(56) References Cited

U.S. PATENT DOCUMENTS

| | | | | |
|---|---|---|---|---|
| 6,044,450 | A * | 3/2000 | Tsushima | G06F 9/30025 712/215 |
| 6,085,306 | A | 7/2000 | Takayama et al. | |
| 6,366,999 | B1 * | 4/2002 | Drabenstott | G06F 9/30036 712/11 |
| 6,484,253 | B1 | 11/2002 | Matsuo | |
| 2002/0019928 | A1 * | 2/2002 | Saulsbury | G06F 9/30021 712/222 |
| 2003/0061471 | A1 * | 3/2003 | Matsuo | G06F 9/30036 712/226 |
| 2004/0215940 | A1 * | 10/2004 | Heishi | G06F 9/30036 712/221 |
| 2005/0182916 | A1 | 8/2005 | Kageyama et al. | |
| 2008/0148012 | A1 * | 6/2008 | Iizuka | G06F 9/3001 712/25 |

FOREIGN PATENT DOCUMENTS

| | | |
|---|---|---|
| JP | 2003-520360 A | 7/2003 |
| JP | 2008-146544 A | 6/2008 |

OTHER PUBLICATIONS

Kathai L V, et al: "HPL Playdoh Architecture Specification: Version 1.0", HP Laboratories Technical Report, XX, XX, Feb. 1, 1994 (Feb. 1, 1994), pp. 1, 01A, 02-37, 39, XP002918902, p. 19: "19 Compare operations".

European Search Report dated Jun. 6, 2014.

* cited by examiner

| LT | < |
| LE | <= |
| EQ | = |
| NE | ≠ |
| GT | > |
| GE | >= |

COMPARISON OPERATORS INCLUDED IN COMPARE INSTRUCTION

Fig. 3

| VLIW INSTRUCTION (FIELDS OTHER THAN THIRD SYNTHESIS DESIGNATION CMB3) || VLIW PROCESSOR 10 |
|---|---|---|
| | SYNTAX CONTENT | |
| COMPARE1+CMB1 | COMPARE1 | V1, V11, V12, ctr1 → [CR1=CMP1] |
| | COMPARE1_AND | V1, V11, V12, ctr1 → [CR1=CMP1 · PR] |
| | COMPARE1_OR | V1, V11, V12, ctr1 → [CR1=CMP1 + PR] |
| COMPARE2+CMB2 | COMPARE2 | V2, V21, V22, ctr2 → [CR2=CMP2] |
| | COMPARE2_AND | V2, V21, V22, ctr2 → [CR2=CMP2 · PR] |
| | COMPARE2_OR | V2, V21, V22, ctr2 → [CR2=CMP2 + PR] |

Fig. 4

| VLIW INSTRUCTION (FOR ONLY THIRD SYNTHESIS DESIGNATION CMB3) | | VLIW PROCESSOR 10 |
|---|---|---|
| IF THERE IS ONLY ONE COMPARE INSTRUCTION | — (INDEPENDENT FROM CMB3) | ctr3→[PR+ =CR1] |
| IF THERE ARE TWO COMPARE INSTRUCTIONS | EMPTY | ctr3→[PR+ =CR1] |
| | CMB3 AND | ctr3→[PR+ =CR1 · CR2] |
| | OR | ctr3→[PR+ =CR1 + CR2] |

```
L_bgn:  compare      d02, 0, NE .. compare       d12, 0, EQ .. Fand
        compare_or   d00, 0, NE .. compare_or    d10, 0, EQ .. Fand
        compare_and  d11, 0, NE .. compare_and   d01, 0, EQ .. Fand
        mset res, 1
```

Fig. 17

```
res=(val>c && (val>b || val==b && (sc==0 || sc==2))?1:0;
```

```
L_bgn:   cmp    val,c,GT
         brf    L_fals .. cmp    val,b,GT
         brt    L_true .. cmp    val,b,EQ
         brf    L_fals .. cmp    sc,0,EQ
         brt    L_true .. cmp    sc,2,EQ
         brf    L_fals
L_true:  set    res,1  .. jmp    L_end
L_fals:  set    res,0
L_end:
```

Related Art

```
L_bgn:   cmp   d01, 0, EQ
         brf   L_fals .. cmp  d11, 0, NE
         brf   L_fals .. cmp  d02, 0, NE
         brf   L_02   .. cmp  d12, 0, EQ
         brt   L_true
L_02:    cmp   d00, 0, NE
         brf   L_fals .. cmp  d10, 0, EQ
         brf   L_fals
L_true:  set   res, 1 .. jmp  L_end
L_fals:  set   res, 0
L_end:
```

Related Art

Fig. 19

VLIW PROCESSOR, INSTRUCTION STRUCTURE, AND INSTRUCTION EXECUTION METHOD

CROSS-REFERENCE TO RELATED APPLICATIONS

The present application is a Continuation application of U.S. patent application Ser. No. 13/686,828, filed on Nov. 27, 2012, which is based on Japanese Patent Application No. 2011-262706, filed on Nov. 30, 2011, the entire contents of which are hereby incorporated by reference.

BACKGROUND

The present invention relates to a VLIW instruction including a plurality of compare instructions, and a technique for executing the VLIW instruction.

Processors (VLIW processors) that use VLIW (Very Long Instruction Word) instructions are capable of executing a plurality of instructions in one cycle, and are therefore used in various fields.

In image processing, for example, a complex conditional judgment is required for processing, such as edge detection, in which values of neighboring pixels are compared to determine the value of a pixel of interest. Expression (1) shows a processing example of an edge detection filter.

$$res=(val>c\&\&(val>b||val==b\&\&(sc==0||sc==2))) \; ?1:0; \quad (1)$$

In the term preceding the mark "?" in Expression (1), each alphabet represents an argument and each value represents an immediate. In addition, "&&" and "||" represent "AND" and "OR", respectively, and each of an equal sign and an inequality sign represents comparison processing. Assuming that the term preceding the mark "?" is X on the right-hand side of Expression (1), Expression (1) represents processing in which "1" is output as the value "res" when X is true, and represents processing in which "0" is output as the value "res" when X is false.

FIG. 18 illustrates an example of a program for use in implementing the processing shown in Expression (1) in a VLIW processor by using branch instructions.

As shown in the program of FIG. 19, for example, the processing shown in Expression (2) below can also be implemented in the VLIW processor by using branch instructions.

$$res=((d01==0)\&\&(d11!=0))\&\&(((d02!=0)\&\& (d12==0))||((d00!=0)\&\&(d10==0))) \quad (2)$$

For example, as shown in the second to fourth lines of the program of FIG. 18 and the second to third lines of the program of FIG. 19, one branch instruction (brf) and one compare instruction (cmp) are executed in parallel. This enhances the processing efficiency as compared with processors that can execute only one instruction in one cycle.

In general, however, there is a problem that it takes a lot of time to execute the branch instruction. For example, if a branch penalty is two cycles, nine cycles are required to execute the program illustrated in FIG. 18 and 12 cycles are required to execute the program illustrated in FIG. 19.

Techniques for the VLIW processor have been proposed from various perspectives.

For example, Japanese Unexamined Patent Application Publication No. 10-27102 discloses a technique for eliminating conditional branching by using predicate registers. The VLIW processor to which this technique is applied includes a plurality of operation units that are provided corresponding to one or more of a plurality of operation instruction fields included in a single VLIW instruction. Each operation unit includes an operation circuit that performs an operation indicated by corresponding one or more operation instruction fields; a register (predicate register) that stores a value for determining whether or not to execute the operation of the operation circuit; and storage means for writing, into the registers within all the operation units, all values obtained by evaluating the operation result of a predetermined instruction, in response to the predetermined instruction. The operation circuit within each operation unit determines whether or not to execute the operation instruction designated in the predicate register described above, according to the value written in the predicate register.

Japanese Unexamined Patent Application Publication No. 07-302199 discloses a technique in which general-purpose sum-of-products circuits are provided in parallel in a VLIW processor and a complex conditional judgment (complex test) is carried out in one cycle to thereby achieve conditional branching.

Japanese Unexamined Patent Application Publication No. 2008-146544 discloses a technique for combining a plurality of condition codes, which are obtained through operations in a plurality of cycles, into a single condition code set.

Published Japanese Translation of PCT International Publication for Patent Application, No. 2003-520360 discloses a technique for obtaining results of a Boolean combination of state information generated from a current compare instruction and a compare instruction in a previous cycle.

SUMMARY

The technique disclosed in Japanese Unexamined Patent Application Publication No. 10-27102 uses predicate registers instead of conditional branching. This technique is effective for reducing the number of times of transfer of a register file between operation units. However, in the case of using a conditional judgment statement having a complex hierarchical structure as shown in Expression (1) and Expression (2), the effect of improving the efficiency is limited.

The technique disclosed in Japanese Unexamined Patent Application Publication No. 07-302199 enables evaluation of a combination of various conditions, which can be represented by a sum-of-products standard form, in one cycle. However, in image processing, for example, in which the combination of conditions can be limited to some extent, there is a problem of an excessive increase in size of hardware.

The technique disclosed in Japanese Unexamined Patent Application Publication No. 2008-146544 effectively achieves branching to a plurality of branch destinations by a condition code set including a plurality of bits. However, the technique is inefficient when there is only one branch destination as in the edge detection filter shown in Expression (1), for example.

The technique disclosed in Published Japanese Translation of PCT International Publication for Patent Application, No. 2003-520360 can obtain results of a Boolean combination of state information generated from a current compare instruction and a compare instruction in a previous cycle. However, the processing shown in Expression (1) and Expression (2), for example, needs to combine (for example, a logical operation) results of a plurality of compare instructions. This makes it difficult to improve the efficiency of the technique disclosed in Published Japanese Translation of PCT International Publication for Patent Application, No. 2003-520360.

There is a demand for a technique capable of efficiently executing the complex conditional judgment processing as shown in Expressions (1) and (2) with a small circuit size, while making full use of the characteristics of the VLIW processor that can execute a plurality of instructions in one cycle.

A first aspect of the present invention is a VLIW processor. The VLIW processor includes a first comparison operation unit, a second comparison operation unit, a first operation unit, a second operation unit, a third operation unit, and a register.

The first comparison operation unit receives a first comparison operation signal, a first input signal, and a second input signal, performs a comparison operation indicated by the first comparison operation signal on the first input signal and the second input signal, and outputs a result of the comparison operation.

The second comparison operation unit receives a second comparison operation signal, a third input signal, and a fourth input signal, performs a comparison operation indicated by the second comparison operation signal on the third input signal and the fourth input signal, and outputs a result of the comparison operation.

The first operation unit receives a first control signal, the comparison result of the first comparison operation unit, and a value already held in the register, and outputs, as a first operation result, one of the comparison result of the first comparison operation unit, an AND of the comparison result of the first comparison operation unit and the value of the register, and an OR of the comparison result of the first comparison operation unit and the value of the register, according to the first control signal.

The second operation unit receives a second control signal, the comparison result of the second comparison operation unit, and a value already held in the register, and outputs, as a second operation result, one of the comparison result of the second comparison operation unit, an AND of the comparison result of the second comparison operation unit and the value of the register, and an OR of the comparison result of the second comparison operation unit and the value of the register, according to the second control signal.

The third operation unit receives a third control signal, the first operation result, and the second operation result, and outputs, as an execution result, one of the first operation result, an AND of the first operation result and the second operation result, and an OR of the first operation result and the second operation result to the register according to the third control signal.

The register newly holds and outputs the execution result received from the third operation unit.

A second aspect of the present invention is an instruction structure of a VLIW instruction. This instruction structure includes a first compare instruction field that stores a first compare instruction; a first synthesis designation field that stores a first synthesis designation; a second compare instruction field that stores a second compare instruction; a second synthesis designation field that stores a second synthesis designation; and a third synthesis designation field that stores a third synthesis designation.

The first synthesis designation indicates, as a first operation result, one of a result of a comparison indicated by the first compare instruction, an AND of the result of the comparison and an execution result of a preceding VLIW instruction, and an OR of the result of the comparison and the execution result of the preceding VLIW instruction.

The second synthesis designation indicates, as a second operation result, one of a result of a comparison indicated by the second compare instruction, an AND of the result of the comparison and the execution result of the preceding VLIW instruction, and an OR of the result of the comparison and the execution result of the preceding VLIW instruction.

The third synthesis designation indicates, as an execution result of a current VLIW instruction, one of the first operation result, an AND of the first operation result and the second operation result, and an OR of the first operation result and the second operation result.

A third aspect of the present invention is a method for executing a VLIW instruction in a VLIW processor, the VLIW processor including a register and configured to receive a VLIW instruction including a first compare instruction, a second compare instruction, and three synthesis designations including first and second synthesis designations each indicating one of "not to synthesize", "AND", and "OR" and a third synthesis designation indicating one of "AND" and "OR".

The execution method includes outputting, as a first operation result, a result of a comparison indicated by the first compare instruction when the first synthesis designation indicates "not to synthesize", and in other cases, outputting, as the first operation result, a value obtained by performing a logical operation indicated by the first synthesis designation on the result of the comparison indicated by the first compare instruction and a value already held in the register.

The execution method further includes outputting, as a second operation result, a result of a comparison indicated by the second compare instruction when the second synthesis designation indicates "not to synthesize", and in other cases, outputting, as the second operation result, a value obtained by performing a logical operation indicated by the second synthesis designation on the result of the comparison indicated by the second compare instruction and a value already held in the register.

The execution method further includes outputting, as an execution result of a current VLIW instruction, a value obtained by performing a logical operation indicated by the third synthesis designation on the first operation result and the second operation result, to the register; and newly holding and outputting, by the register, the execution result.

Note that the implementation of the VLIW processor according to the above aspect as an apparatus or a system, a VLIW instruction having the instruction structure according to the above aspect, a program including the VLIW instruction, a VLIW processor that executes the VLIW instruction and the method according to the above aspect, and the like are also effective as aspects of the present invention.

According to the technique of the present invention, it is possible to efficiently execute complex conditional judgment processing with a small circuit size in a VLIW processor.

BRIEF DESCRIPTION OF THE DRAWINGS

The above and other aspects, advantages and features will be more apparent from the following description of certain embodiments taken in conjunction with the accompanying drawings, in which:

FIG. 3 is table illustrating examples of a comparison operator included in a compare instruction of the VLIW instruction illustrated in FIG. 2;

FIG. 4 is a table illustrating a correspondence relationship between the VLIW instruction illustrated in FIG. 2 and each signal in the VLIW processor illustrated in FIG. 1 (Part I);

FIG. 5 is table illustrating a correspondence relationship between the VLIW instruction illustrated in FIG. 2 and each signal in the VLIW processor illustrated in FIG. 1 (Part II);

FIG. 17 is a diagram illustrating an example of program for use in implementing the processing shown in Expression (1) in the VLIW processor illustrated in FIG. 6;

FIG. 18 is a diagram illustrating an example of the implementation of the processing shown in Expression (1) in a VLIW processor of a related art; and FIG. 19 is a diagram illustrating an example of the implementation of the processing shown in Expression (1) in the VLIW processor of the related art.

DETAILED DESCRIPTION

Figure 1:
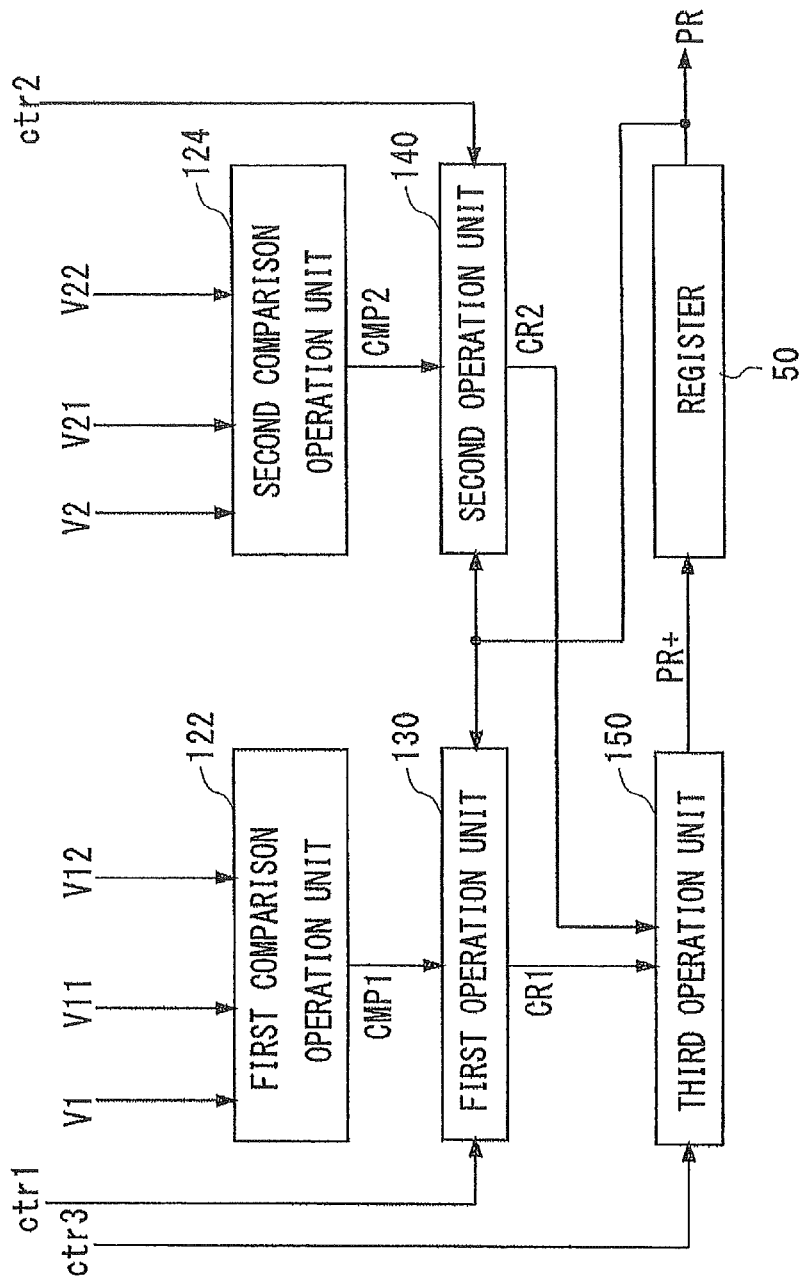
FIG. 1 is a diagram illustrating a VLIW processor for explaining the principle of a technique according to the present invention.

Hereinafter, embodiments of the present invention will be described with reference to the accompanying drawings. The following description and drawings are omitted and simplified as appropriate for clarification of the explanation. Note that in the drawings, the same elements are denoted by the same reference numerals, and a repeated explanation is omitted as needed.

Prior to the description of specific embodiments of the present invention, the principle of the technique according to the present invention will now be described with reference to FIGS. 1 to 5.

A VLIW processor 10 illustrated in FIG. 1 includes a first comparison operation unit 122, a second comparison operation unit 124, a first operation unit 130, a second operation unit 140, a third operation unit 150, and a register 50. An adder-subtractor or an ALU (Arithmetic Logic Unit) for arithmetic operation, which is provided in a typical processor, may be used as each of the first comparison operation unit 122 and the second comparison operation unit 124.

The first comparison operation unit 122 receives a first comparison operation signal V1, a first input signal V11, and a second input signal V12, performs a comparison operation indicated by the first comparison operation signal V1 on the first input signal V11 and the second input signal V12, and outputs a result of the comparison operation. The comparison result obtained by the first comparison operation unit 122 is referred to as a first comparison result CMP1.

The second comparison operation unit 124 receives a second comparison operation signal V2, a third input signal V21, and a fourth input signal V22, performs a comparison operation indicated by the second comparison operation signal V2 on the third input signal V21 and the fourth input signal V22, and outputs a result of the comparison operation. The comparison result obtained by the second comparison operation unit 124 is referred to as a second comparison result CMP2.

The first operation unit 130 receives a first control signal ctr1, the first comparison result CMP1, and a value (PR) that is already held in the register 50, and outputs, as a first operation result CR1, one of the first comparison result CMP1, the AND of the first comparison result CMP1 and the value PR of the register 50, and the OR of the first comparison result CMP1 and the value PR of the register, according to the first control signal ctr1.

The second operation unit 140 receives a second control signal ctr2, the second comparison result CMP2, and the value PR of the register 50, and outputs, as a second operation result CR2, one of the second comparison result CMP2, the AND of the second comparison result CMP2 and the value PR of the register 50, and the OR of the second comparison result CMP2 and the value PR of the register, according to the second control signal ctr2.

The third operation unit 150 receives a third control signal ctr3, the first operation result CR1, and the second operation result CR2, and outputs, as an execution result (PR+), one of the first operation result CR1, the AND of the first operation result CR1 and the second operation result CR2, and the OR of the first operation result CR1 and the second operation result CR2 to the register 50 according to the third control signal ctr3.

The register 50 newly holds the execution result PR+ received from the third operation unit 150 and outputs the execution result as needed. The value PR held in the register 50 is overwritten with the execution result PR+.

Figure 2:
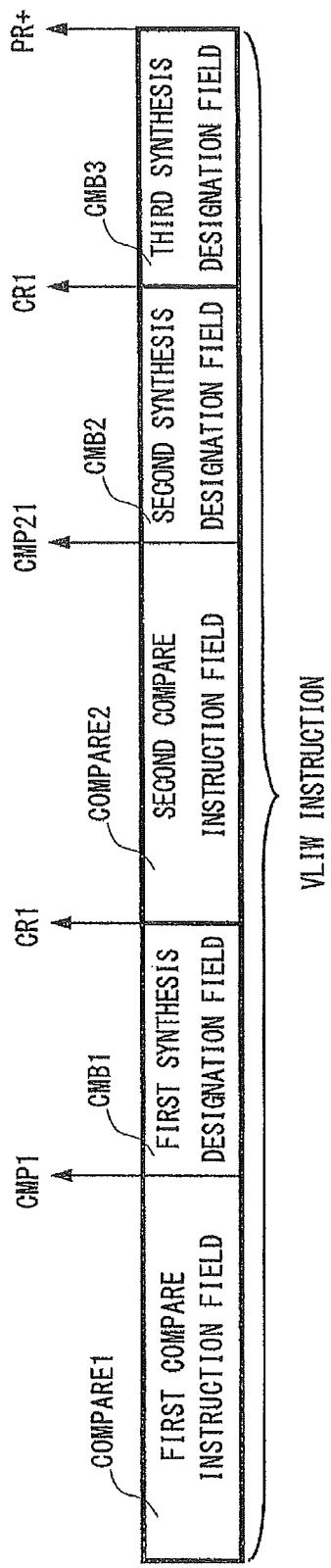
FIG. 2 is a diagram illustrating a structure of a VLIW instruction to be processed by the VLIW processor illustrated in FIG. 1.

The VLIW processor 10 can execute a VLIW instruction having a structure illustrated in FIG. 2. Referring now to FIGS. 2 and 3, the structure of the VLIW instruction to be executed by the VLIW processor 10 will be described.

As illustrated in FIG. 2, the VLIW instruction includes a first compare instruction field that stores a first compare instruction COMPARE1; a first synthesis designation field that stores a first synthesis designation CMB1 corresponding to the first compare instruction COMPARE1; a second compare instruction field that stores a second compare instruction COMPARE2; a second synthesis designation field that stores a second synthesis designation CMB2 corresponding to the second compare instruction COM- PARE2; and a third synthesis designation field that stores a third synthesis designation CMB3.

Each of the first compare instruction COMPARE1 and the second compare instruction COMPARE2 is a normal compare instruction that includes two input operands and one comparison operator op. The two input operands correspond to comparison targets in the comparison operation indicated by the one comparison operator op.

FIG. 3 illustrates examples of the comparison operator op included in the first compare instruction COMPARE1 and the second compare instruction COMPARE2. As illustrated in FIG. 3, examples of the comparison operator op include "LT", "LE", "EQ", "NE", "GT", and "GE" which respectively indicate "less than", "less than or equal to", "equal to", "not equal to", "greater than", and "greater than or equal to".

The comparison result of the first compare instruction COMPARE1 corresponds to the first comparison result CMP1 in the VLIW processor 10 illustrated in FIG. 1. The comparison result of the second compare instruction COMPARE2 corresponds to the second comparison result CMP2 in the VLIW processor 10 illustrated in FIG. 1. The operation result determined by the first compare instruction COMPARE1 and the first synthesis designation CMB1 corresponds to the first operation result CR1 in the VLIW processor 10. The operation result determined by the second compare instruction COMPARE2 and the second synthesis designation CMB2 corresponds to the second operation result CR2 in the VLIW processor 10. The execution result of the current VLIW instruction corresponds to the execution result PR+ in the VLIW processor 10. The execution result of the preceding VLIW instruction corresponds to the execution result PR in the VLIW processor 10. This will be described in more detail below with reference to FIGS. 4 and 5.

The first synthesis designation CMB1 indicates, as the operation result (first operation result CR1), one of the comparison result (first comparison result CMP1) indicated by the first compare instruction COMPARE1, the AND of the first comparison result CMP1 and the execution result PR, and the OR of the first comparison result CMP1 and the execution result PR.

The second synthesis designation CMB2 indicates, as the operation result (second operation result CR2), one of the comparison result (second comparison result CMP2) indicated by the second compare instruction COMPARE2, the AND of the second comparison result CMP2 and the execution result PR, and the OR of the second comparison result CMP2 and the execution result PR.

The third synthesis designation CMB3 indicates, as the execution result (execution result PR+) of the current VLIW instruction, one of the AND of the first operation result CR1 and the second operation result CR2 and the OR of the first operation result CR1 and the second operation result CR2.

FIGS. 4 and 5 each show a correspondence relationship between specific examples of components of the VLIW instruction illustrated in FIG. 2 and signals for use in execution of the VLIW instruction in each specific example by the VLIW processor 10. FIG. 4 illustrates fields other than the third synthesis designation CMB3 of the VLIW instruction, and the first control signal ctrl and the second control signal ctrl of the VLIW processor 10. FIG. 5 illustrates the third synthesis designation CMB3 of the VLIW instruction and the third control signal ctr3 of the VLIW processor 10.

As described above, the first compare instruction COMPARE1 includes one comparison operator and two input operands, as with a normal compare instruction. In the VLIW processor 10, the signal indicative of the comparison operation indicated by the comparison operator included in the first compare instruction COMPARE1 is input to the first comparison operation unit 122 as the first comparison operation signal V1. The two operands included in the first compare instruction COMPARE1 are input as the first input signal V11 and the second input signal V12, respectively, to the first comparison operation unit 122.

The first synthesis designation CMB1 indicates one of "not to synthesize", "AND", and "OR". The term "not to synthesize" indicates that the first comparison result CMP1 is output as the first operation result CR1. Note that any character may be used as the first synthesis designation CMB1 indicating "not to synthesize", as long as it can indicate "not to synthesize". In the example illustrated in FIG. 4, when the field of the first synthesis designation CMB1 is empty, the empty field indicates "not to synthesize".

When the first synthesis designation CMB1 indicates "not to synthesize", in the VLIW processor 10, the first control signal ctrl indicating that the first comparison result CMP1 is output as the first operation result CR1 is input to the first operation unit 130.

When the first synthesis designation CMB1 indicates a logical operation other than "not to synthesize", that is, "AND" or "OR", in the VLIW processor 10, the first control signal ctrl indicating that the result obtained by performing the logical operation indicated by the first synthesis designation CMB1 on the first comparison result CMP1 and the preceding execution result PR is output as the first operation result CR1 is input to the first operation unit 130.

As described above, the second compare instruction COMPARE2 also includes one comparison operator and two input operands, as with a normal compare instruction. In the VLIW processor 10, the signal indicative of the comparison operation indicated by the comparison operator included in the second compare instruction COMPARE2 is input to the second comparison operation unit 124 as the second comparison operation signal V2. The two operands included in the second compare instruction COMPARE2 are input as the third input signal V21 and the fourth input signal V22, respectively, to the second comparison operation unit 124.

As with the first synthesis designation CMB1, the second synthesis designation CMB2 indicates one of "not to synthesize", "AND", and "OR". The term "not to synthesize" indicates that the second comparison result CMP2 is output as the second operation result CR2. Note that any character may be used as the second synthesis designation CMB2 indicating "not to synthesize", as long as it can indicate "not to synthesize". In the example illustrated in FIG. 4, when the field of the second synthesis designation CMB2 is empty, the empty field indicates "not to synthesize".

When the second synthesis designation CMB2 indicates "not to synthesize", in the VLIW processor 10, the second control signal ctr2 indicating that the second comparison result CMP2 is output as the second operation result CR2 is input to the second operation unit 140.

When the second synthesis designation CMB2 indicates a logical operation other than "not to synthesize", that is, "AND" or "OR", in the VLIW processor 10, the second control signal ctr2 indicating that the result obtained by performing the logical operation indicated by the second synthesis designation CMB2 on the second comparison result CMP2 and the preceding execution result PR is output as the second operation result CR2 is input to the second operation unit 140.

The third synthesis designation CMB3 indicates a logical operation of one of "AND" and "OR". In the VLIW processor 10, the third control signal ctr3 indicating that the result obtained by performing the logical operation indicated by the third synthesis designation CMB3 on the first operation result CR1 and the second operation result CR2 is output as the execution result PR+ is input to the third operation unit 150.

Note that the second compare instruction field and the third synthesis designation field may be empty. As illustrated in FIG. 5, when there is only one COMPARE instruction, i.e., when the second compare instruction field is empty, the third synthesis designation CMB3 is not referred to and the third control signal ctr3 indicating that the first operation result CR1 is output as the execution result PR+ of the current instruction is input to the third operation unit 150. Also when the field of the third synthesis designation CMB3 is empty, the third control signal ctr3 indicating that the first operation result CR1 is output as the execution result PR+ of the current instruction is input to the third operation unit 150. In these two cases, the second comparison operation unit 124 and the second operation unit 140 execute no operation.

The VLIW processor 10 that processes the VLIW instruction illustrated in FIG. 2 can effectively perform conditional judgment processing including in a plurality of comparison processings, with a small circuit size. This will be described in more detail with reference to the following embodiment.

Figure 6:
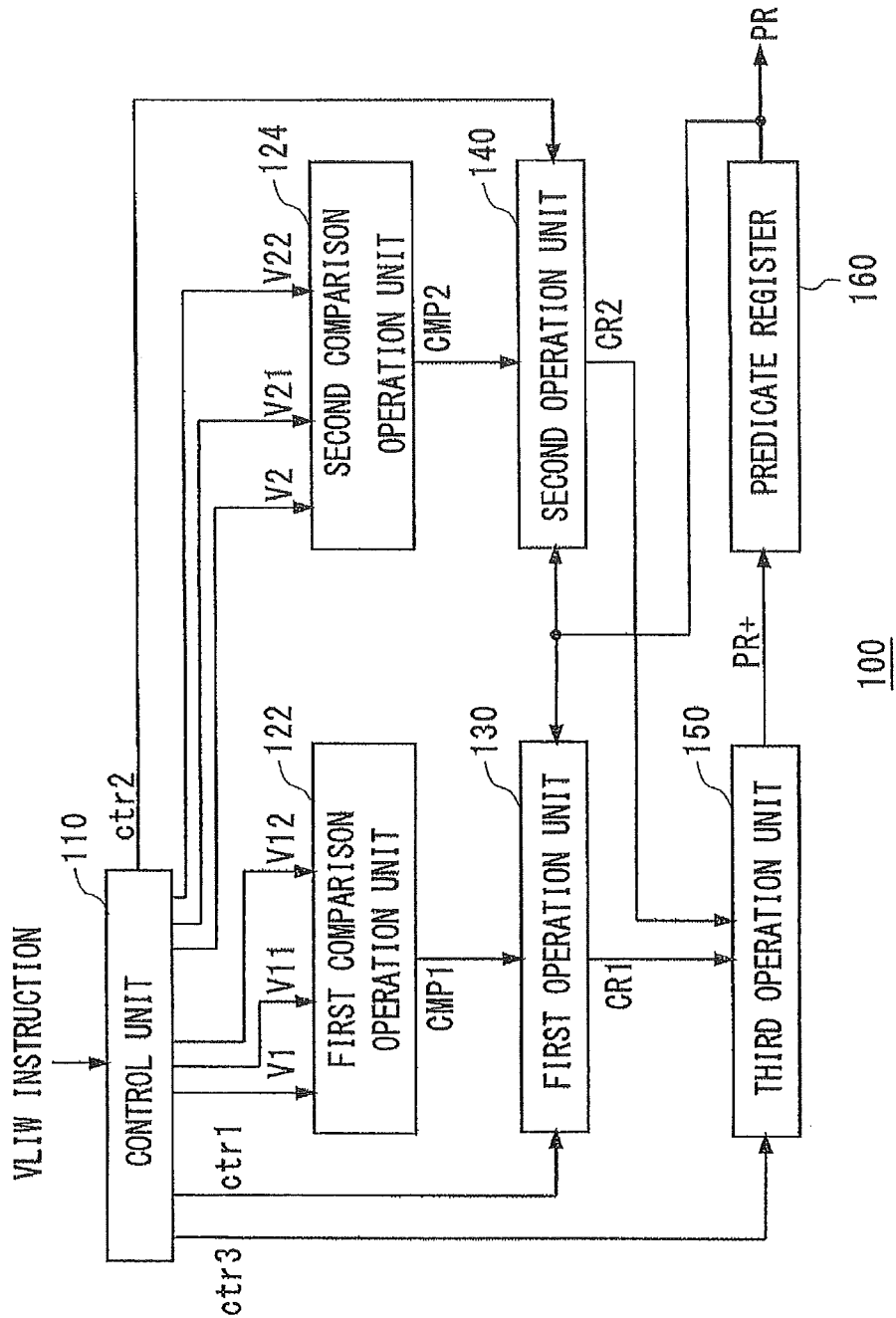
FIG. 6 is a diagram illustrating a VLIW processor according to an embodiment of the present invention.

FIG. 6 illustrates a VLIW processor 100 according to an embodiment of the present invention. To avoid redundant explanation, the components (including signals) of FIG. 6 which are similar to those illustrated in FIG. 1 are denoted by the same reference numerals and are explained as needed.

The VLIW processor 100 includes a control unit 110, the first comparison operation unit 122, the second comparison operation unit 124, the first operation unit 130, the second operation unit 140, the third operation unit 150, and a predicate register 160.

The control unit 110 includes an instruction register (not shown) that stores the received VLIW instruction. Based on the VLIW instruction stored in the instruction register, the control unit 110 outputs the first comparison operation signal V1, the first input signal V11, the second input signal V12, the second comparison operation signal V2, the third input signal V21, the fourth input signal V22, the first control signal ctr1, the second control signal ctr2, and the third control signal ctr3.

Specifically, the control unit 110 outputs the first comparison operation signal V1, the first input signal V11, and the second input signal V12 to the first comparison operation unit 122. The first comparison operation signal V1, the first input signal V11, and the second input signal V12 respectively indicate the comparison operator and two operands included in the first compare instruction COMPARE1.

The control unit 110 outputs the second comparison operation signal V2, the third input signal V21, and the fourth input signal V22 to the second comparison operation unit 124. The second comparison operation signal V2, the third input signal V21, and the fourth input signal V22 respectively indicate the comparison operator and two operands included in the second compare instruction COMPARE2.

Further, the control unit 110 outputs the first control signal ctr1 corresponding to the first synthesis designation CMB1, the second control signal ctr2 corresponding to the second synthesis designation CMB2, and the third control signal ctr3 corresponding to the third synthesis designation CMB3 to the first operation unit 130, the second operation unit 140, and the third operation unit 150, respectively. When the second compare instruction COMPARE2 and the second synthesis designation CMB2 are empty, or when the third synthesis designation CMB3 is empty, the control unit 110 recognizes that the third synthesis designation CMB3 indicates "not to synthesize", and outputs the third control signal ctr3 indicating "not to synthesize" to the third operation unit 150.

The first comparison operation unit 122 performs a comparison operation and outputs the first comparison result CMP1 to the first operation unit 130. The second comparison operation unit 124 performs a comparison operation and outputs the second comparison result CMP2 to the second operation unit 140.

Figure 7:
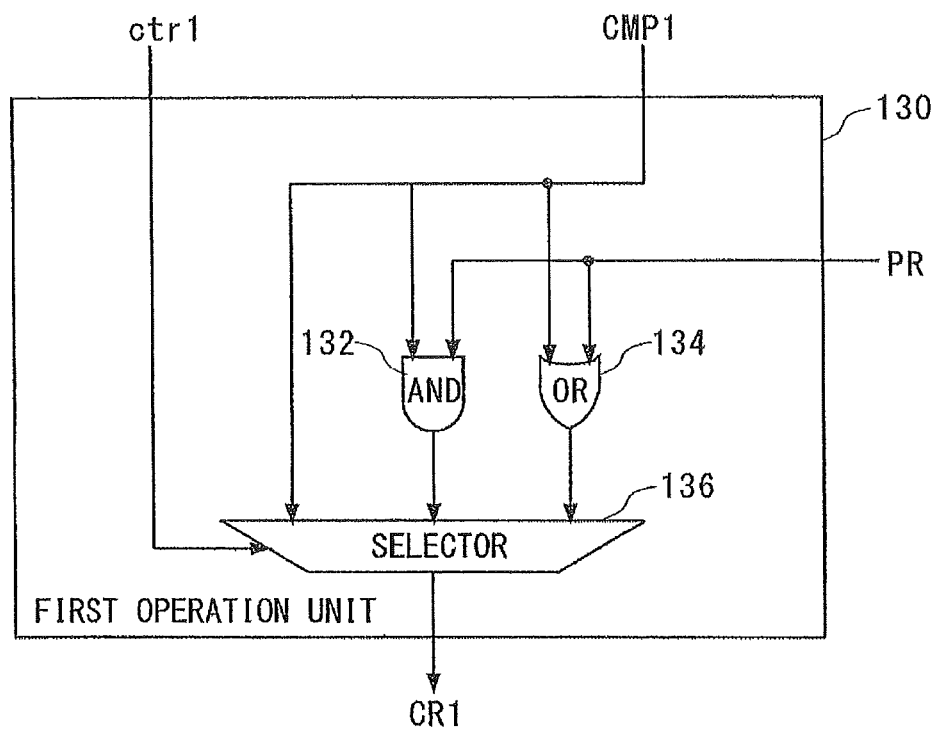
FIG. 7 is a diagram illustrating a first operation unit in the VLIW processor illustrated in FIG. 6.

FIG. 7 illustrates the first operation unit 130. The first operation unit 130 includes an AND gate 132, an OR gate 134, and a selector 136.

Each of the AND gate 132 and the OR gate 134 receives the first comparison result CMP1 from the first comparison operation unit 122 and the execution result PR from the predicate register 160. The AND gate 132 outputs the AND of the first comparison result CMP1 and the execution result PR to the selector 136. The OR gate 134 outputs the OR of the first comparison result CMP1 and the execution result PR to the selector 136.

The selector 136 receives the AND from the AND gate 132, the OR from the OR gate 134, the first comparison result CMP1, and the first control signal ctr1 from the control unit 110, selects one of the received three values according to the first control signal ctr1, and outputs the selected value to the third operation unit 150. The output of the selector 136 is the first operation result CR1.

Specifically, when the first control signal ctr1 indicates "not to synthesize", the first operation unit 130 outputs the first comparison result CMP1 as the first operation result CR1. On the other hand, when the first control signal ctr1 indicates "AND", the first operation unit 130 outputs the output of the AND gate 132 as the first operation result CR1, and when the first control signal ctr1 indicates "OR", the first operation unit 130 outputs the output of the OR gate 134 as the first operation result CR1.

Figure 8:
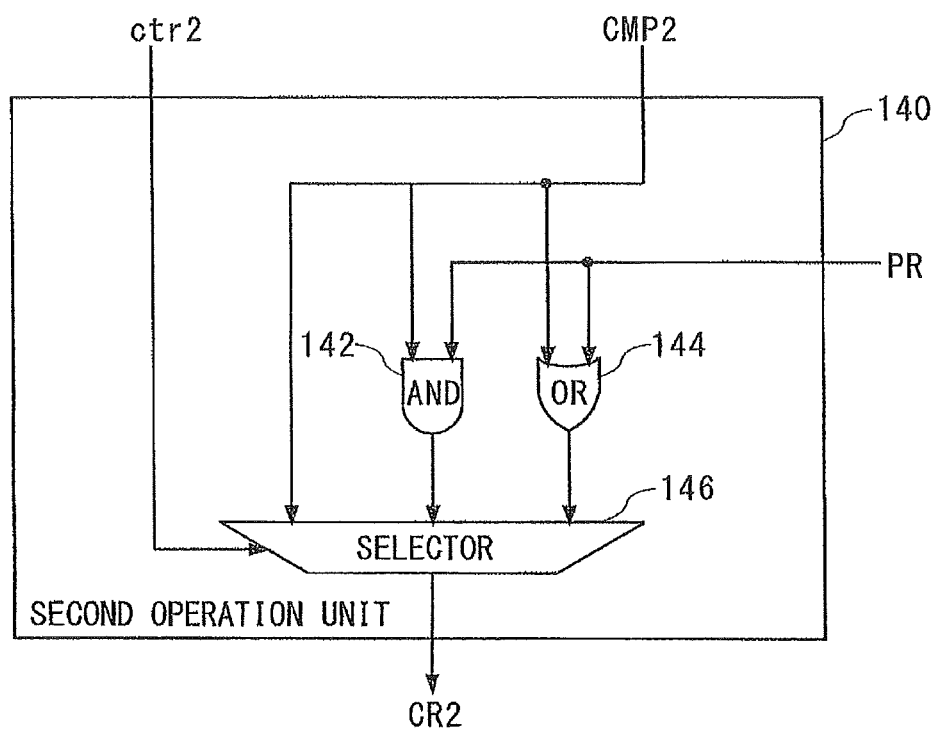
FIG. 8 is a diagram illustrating a second comparison operation unit in the VLIW processor illustrated in FIG. 6.

FIG. 8 illustrates the second operation unit 140. The second operation unit 140 includes an AND gate 142, an OR gate 144, and a selector 146.

Each of the AND gate 142 and the OR gate 144 receives the second comparison result CMP2 from the second comparison operation unit 124 and the execution result PR from the predicate register 160. The AND gate 142 outputs the AND of the second comparison result CMP2 and the execution result PR to the selector 146. The OR gate 144 outputs the OR of the second comparison result CMP2 and the execution result PR to the selector 146.

The selector 146 receives the AND from the AND gate 142, the OR from the OR gate 144, the second comparison result CMP2, and the second control signal ctr2 from the control unit 110, selects one of the three input values according to the second control signal ctr2, and outputs the selected value to the third operation unit 150. The output of the selector 146 is the second operation result CR2.

Specifically, when the second control signal ctr2 indicates "not to synthesize", the second operation unit 140 outputs the second comparison result CMP2 as the second operation result CR2. On the other hand, when the second control signal ctr2 indicates "AND", the second operation unit 140 outputs the output of the AND gate 142 as the second operation result CR2, and when the second control signal ctr2 indicates "OR", the second operation unit 140 outputs the output of the OR gate 144 as the second operation result CR2.

Figure 9:
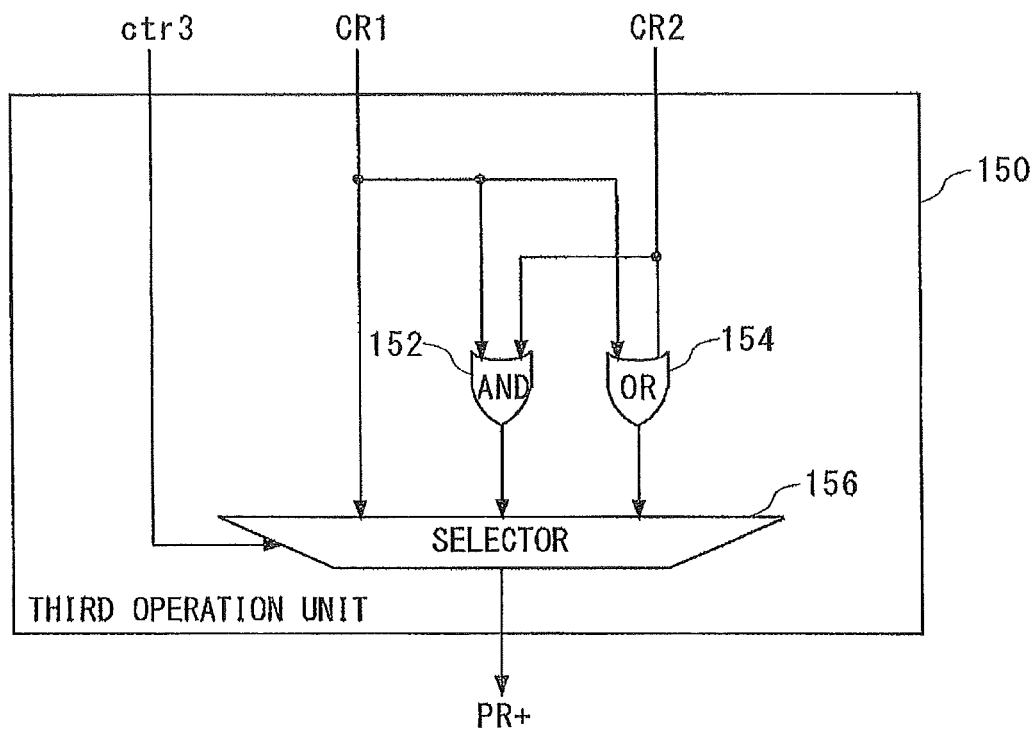
FIG. 9 is a diagram illustrating a third operation unit in the VLIW processor illustrated in FIG. 6.

FIG. 9 illustrates the third operation unit 150. The third operation unit 150 includes an AND gate 152, an OR gate 154, and a selector 156.

Each of the AND gate 152 and the OR gate 154 receives the first operation result CR1 from the first operation unit 130 and the second operation result CR2 from the second operation unit 140. The AND gate 152 outputs the AND of the first operation result CR1 and the second operation result CR2 to the selector 156. The OR gate 154 outputs the OR of the first operation result CR1 and the second operation result CR2 to the selector 156.

The selector 156 receives the AND from the AND gate 152, the OR from the OR gate 154, the first operation result CR1, and the third control signal ctr3 from the control unit 110, selects one of the received three values according to the third control signal ctr3, and outputs the selected value to the predicate register 160. The output of the selector 156 is the execution result PR+.

Specifically, when the third control signal ctr3 indicates "not to synthesize", the third operation unit 150 outputs the first operation result CR1 as the execution result PR+. On the other hand, when the third control signal ctr3 indicates "AND", the third operation unit 150 outputs the output of the AND gate 152 as the execution result PR+, and when the third control signal ctr3 indicates "OR", the third operation unit 150 outputs the output of the OR gate 154 as the execution result PR+.

The predicate register 160 holds the latest execution result PR+ from the third operation unit 150. Specifically, the execution result PR+, which is the execution result of the current VLIW instruction, becomes the execution result PR upon execution of the subsequent VLIW instruction.

Referring to FIGS. 10 to 13, a description is given of processing to be executed by the VLIW processor 100 for each pattern of a combination of compare instructions and synthesis designations in the VLIW instruction illustrated in FIG. 2.

<Pattern A>

Pattern A is a pattern representing that the VLIW instructions include the first compare instruction COMPARE1 and the second compare instruction COMPARE2 and all synthesis designation fields (CMB1, CMB2, and CMB3) indicate one of "AND" and "OR". Pattern A includes four patterns A(1) to A(4).

Figure 10:
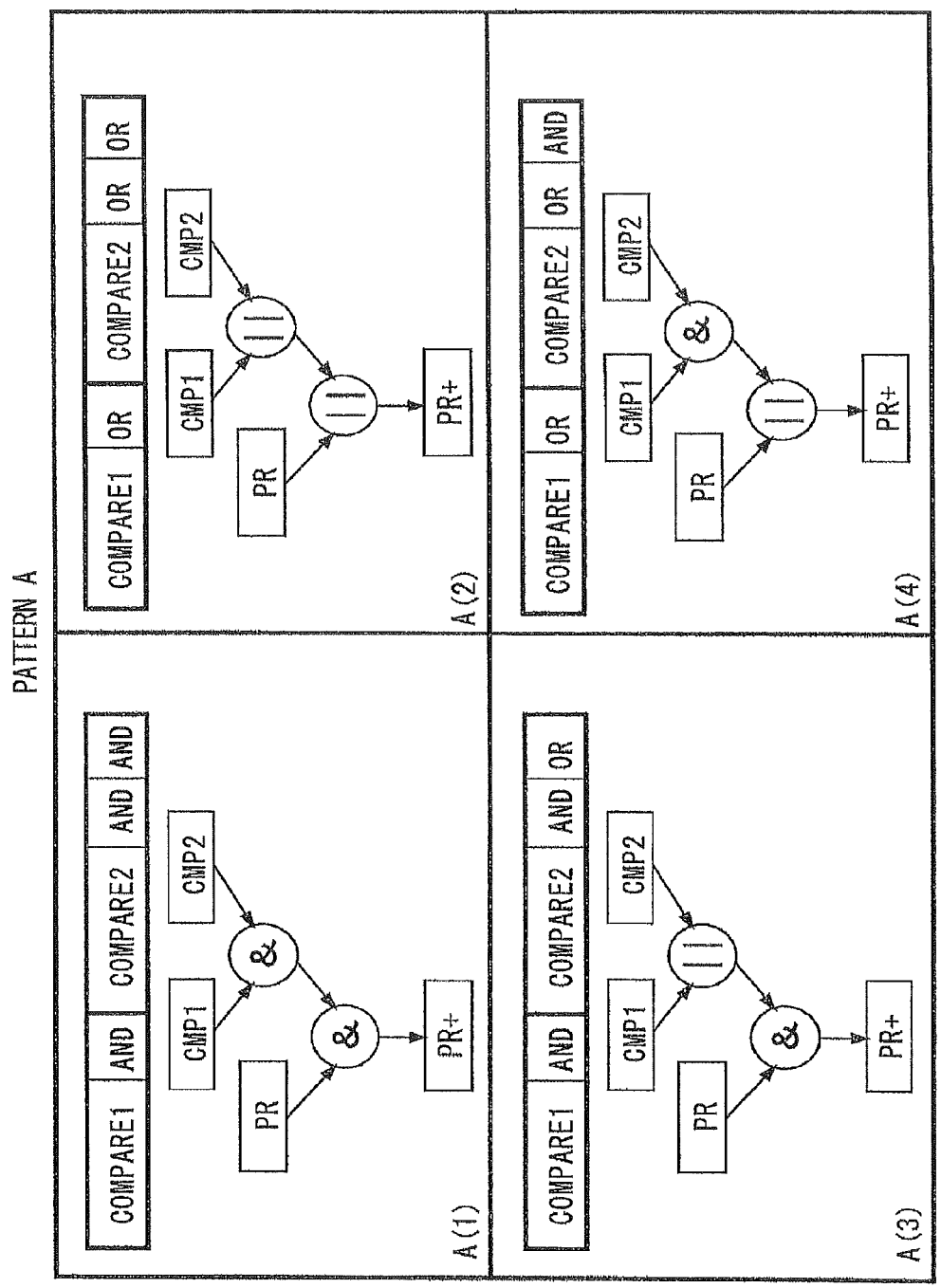
FIG. 10 is a diagram for explaining processing to be executed by the VLIW processor illustrated in FIG. 6 in the case of using instructions of Pattern A.

As illustrated in FIG. 10, Pattern A(1) represents the VLIW instruction "COMPARE1_AND COMPARE2_AND AND" in which all synthesis designation fields indicate "AND".

In the case of Pattern A(1), the execution result PR+ obtained by the VLIW processor 100 indicates the AND of the execution result PR (preceding execution result) and the AND of the first comparison result CMP1 and the second comparison result CMP2.

Pattern A(2) represents the VLIW instruction "COMPARE1_OR COMPARE2_OR OR" in which all synthesis designation fields indicate "OR".

In the case of Pattern A(2), the execution result PR+ obtained by the VLIW processor 100 indicates the OR of the execution result PR and the OR of the first comparison result CMP1 and the second comparison result CMP2.

Pattern A(3) represents the VLIW instruction "COMPARE1_AND COMPARE2_AND OR" in which the first synthesis designation CMB1 and the second synthesis designation CMB2 indicate "AND" and the third synthesis designation CMB3 indicates "OR".

In the case of Pattern A(3), the execution result PR+ obtained by the VLIW processor 100 indicates the AND of the execution result PR and the OR of the first comparison result CMP1 and the second comparison result CMP2.

Pattern A(4) represents the VLIW instruction "COMPARE1_OR COMPARE2_OR AND" in which the first synthesis designation CMB1 and the second synthesis designation CMB2 indicate "OR" and the third synthesis designation CMB3 indicates "AND".

In the case of Pattern A(4), the execution result PR+ obtained by the VLIW processor 100 indicates the OR of the execution result PR and the AND of the first comparison result CMP1 and the second comparison result CMP2.

That is, in the case of the instruction of Pattern A, the VLIW processor 100 can execute, in one cycle, two compare instructions, a logical operation between the execution result PR and the result of a comparison indicated by the first compare instruction, a logical operation between the execution result PR and the result of a comparison indicated by the second compare instruction, and a logical operation between the results of the two logical operations.

<Pattern B>

Pattern B is a pattern representing that the VLIW instructions include the first compare instruction COMPARE1 and the second compare instruction COMPARE2; one of the fields of the first synthesis designation CMB1 and the second synthesis designation CMB2 is empty; and the third synthesis designation CMB3 indicates one of "AND" and "OR". Pattern B includes four patterns B(1) to B(4).

Figure 11:
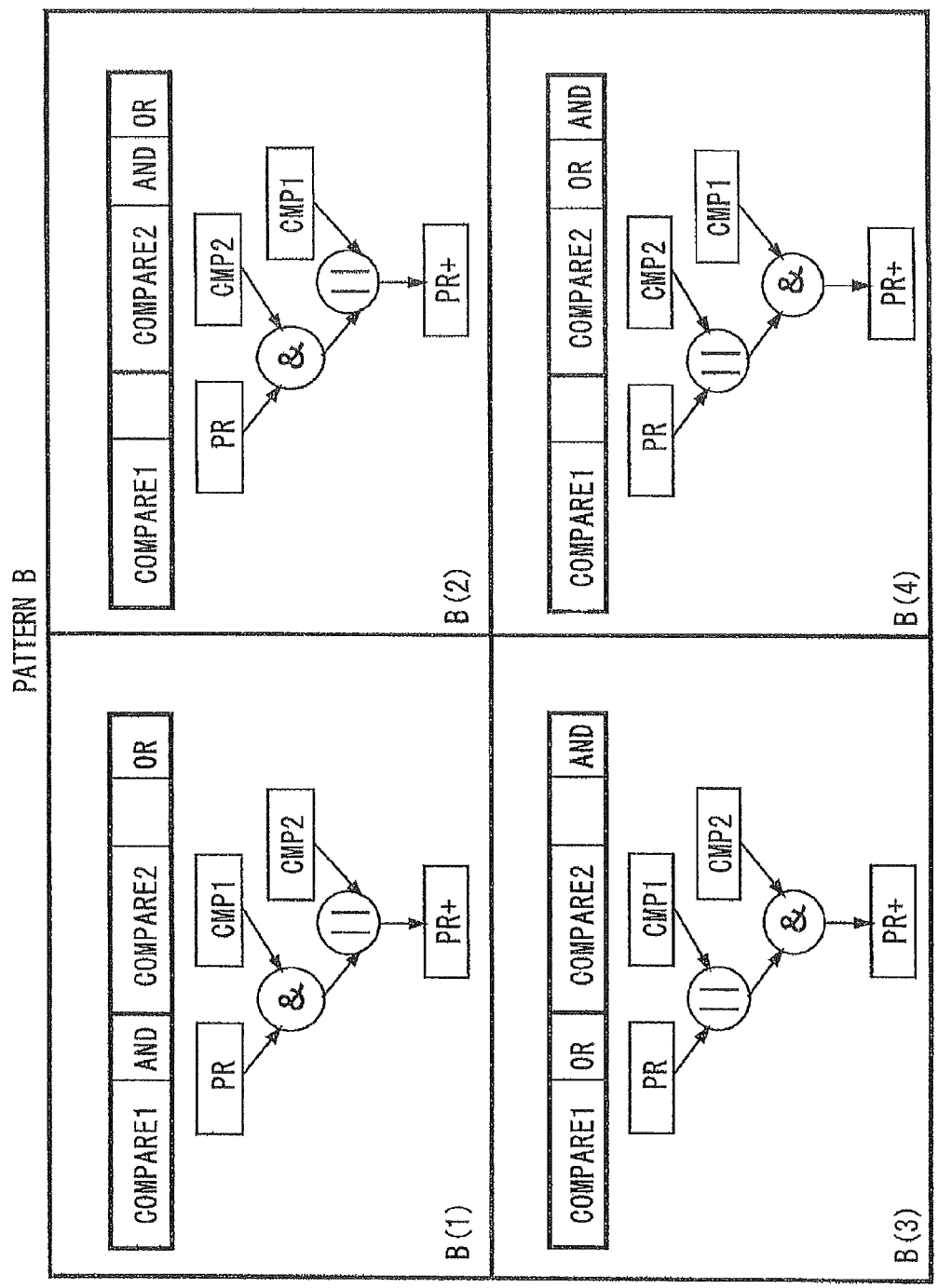
FIG. 11 is a diagram for explaining processing to be executed by the VLIW processor illustrated in FIG. 6 in the case of using instructions of Pattern B.

As illustrated in FIG. 11, Pattern B(1) represents the VLIW instruction "COMPARE1_AND COMPARE2_OR" in which the first synthesis designation CMB1 indicates "AND"; the field of the second synthesis designation CMB2 is empty; and the third synthesis designation CMB3 indicates "OR".

In the case of Pattern B(1), the execution result PR+ obtained by the VLIW processor 100 indicates the OR of the second comparison result CMP2 and the AND of the first comparison result CMP1 and the execution result PR.

Pattern B(2) represents the VLIW instruction "COMPARE1_COMPARE2_AND OR" in which the field of the first synthesis designation CMB1 is empty; the second synthesis designation CMB2 indicates "AND"; and the third synthesis designation CMB3 indicates "OR".

In the case of Pattern B(2), the execution result PR+ obtained by the VLIW processor 100 indicates the OR of the first comparison result CMP1 and the AND of the second comparison result CMP2 and the execution result PR.

Pattern B(3) represents the VLIW instruction "COMPARE1_OR COMPARE2_AND" in which the first synthesis designation CMB1 indicates "OR"; the field of the second synthesis designation CMB2 is empty; and the third synthesis designation CMB3 indicates "AND".

In the case of Pattern B(3), the execution result PR+ obtained by the VLIW processor 100 indicates the AND of the second comparison result CMP2 and the OR of the first comparison result CMP1 and the execution result PR.

Pattern B(4) represents the VLIW instruction "COMPARE1_ COMPARE2_OR AND" in which the field of the first synthesis designation CMB1 is empty; the second synthesis designation CMB2 indicates "OR"; and the third synthesis designation CMB3 indicates "AND".

In the case of Pattern B(4), the execution result PR+ obtained by the VLIW processor 100 indicates the OR of the first comparison result CMP1 and the AND of the second comparison result CMP2 and the execution result PR.

That is, in the case of the instruction of Pattern B, the VLIW processor 100 can execute, in one cycle, two compare instructions, a logical operation between the execution result PR and the result of a comparison indicated by one of the compare instructions, and a logical operation between the result of the logical operation and the execution result of the other compare instruction.

<Pattern C>

Pattern C is a pattern representing that the VLIW instructions include the first compare instruction COMPARE1 and the second compare instruction COMPARE2; the fields of the first synthesis designation CMB1 and the second synthesis designation CMB2 are empty; and the third synthesis designation CMB3 indicates one of "AND" and "OR". Pattern C includes two patterns C(1) and C(2).

Figure 12:
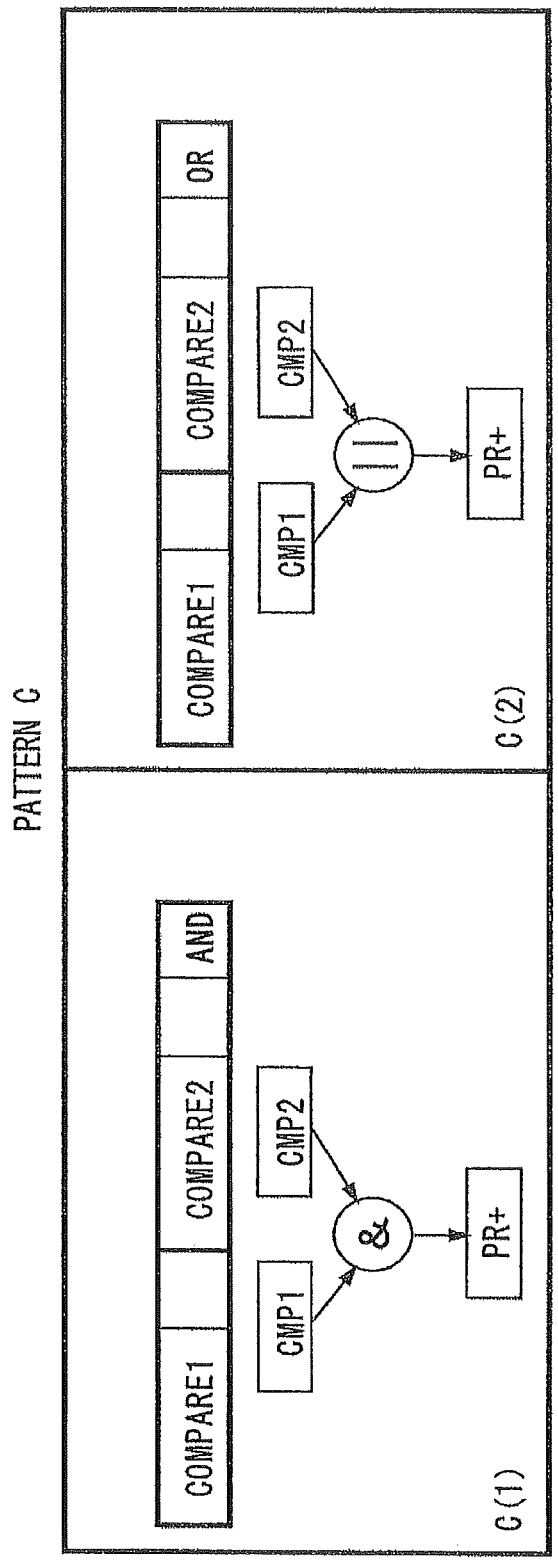
FIG. 12 is a diagram for explaining processing to be executed by the VLIW processor illustrated in FIG. 6 in the case of using instructions of Pattern C.

As illustrated in FIG. 12, Pattern C(1) represents the VLIW instruction "COMPARE1_COMPARE2_AND" in which the third synthesis designation CMB3 indicates "AND".

In the case of Pattern C(1), the execution result PR+ obtained by the VLIW processor 100 indicates the AND of the first comparison result CMP1 and the second comparison result CMP2.

Pattern C(2) represents the VLIW instruction "COMPARE1_COMPARE2_OR" in which the third synthesis designation CMB3 indicates "OR".

In the case of Pattern C(2), the execution result PR+ obtained by the VLIW processor 100 indicates the OR of the first comparison result CMP1 and the second comparison result CMP2.

That is, in the case of the instruction of Pattern C, the VLIW processor 100 can execute, in one cycle, two compare instructions and a logical operation between the results of comparisons indicated by the two compare instructions.

<Pattern D>

In the patterns A to C described above, the VLIW instructions include two compare instructions. This pattern D represents a VLIW instruction including only one compare instruction (first compare instruction COMPARE1). Pattern D includes three patterns D(1) to D(3).

Figure 13:
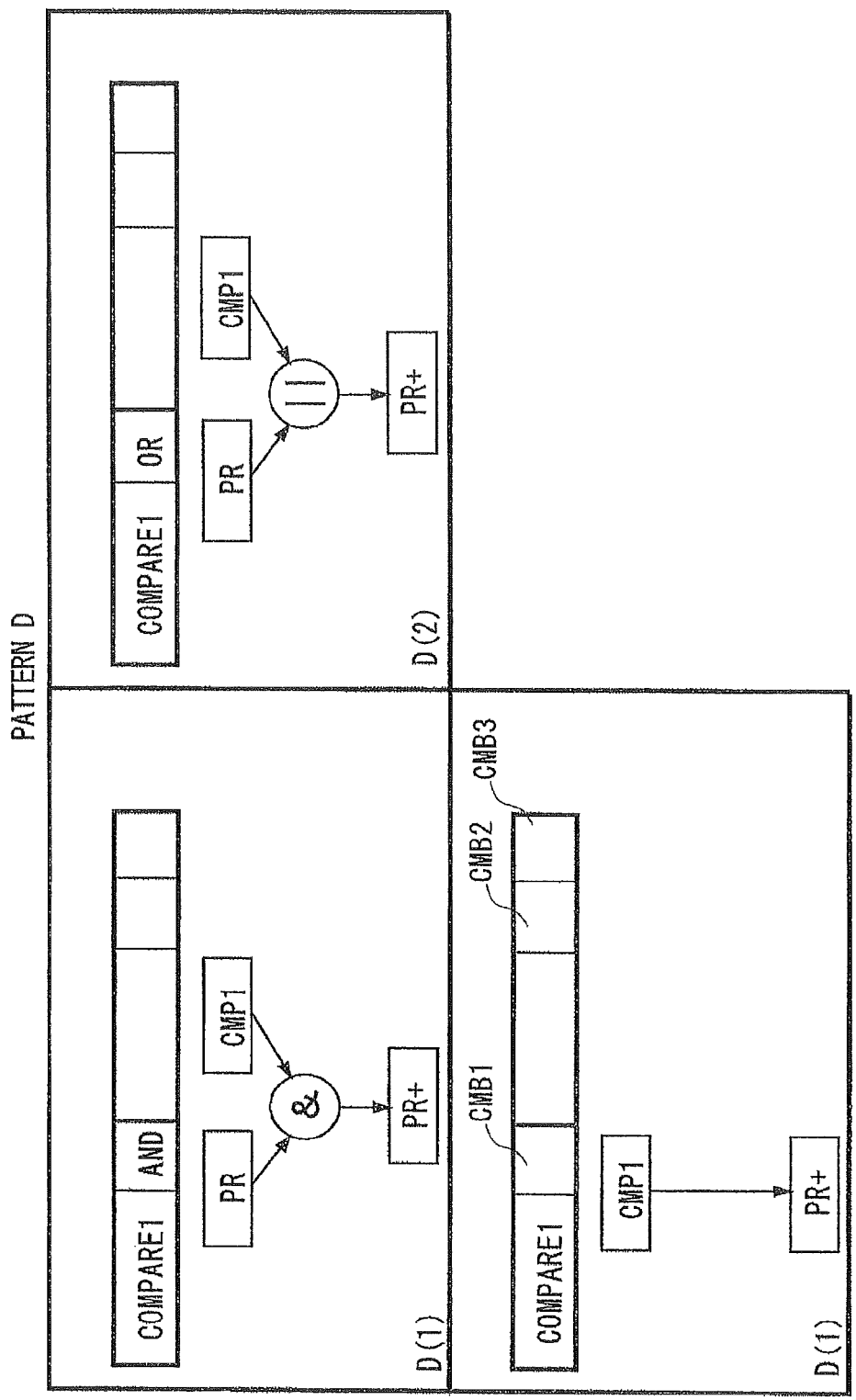
FIG. 13 is a diagram for explaining processing to be executed by the VLIW processor illustrated in FIG. 6 in the case of using instructions of Pattern D.

As illustrated in FIG. 13, Pattern D(1) represents the VLIW instruction "COMPARE1_AND" in which the first synthesis designation CMB1 corresponding to the first compare instruction COMPARE1 indicates "AND".

In the case of Pattern D(1), the execution result PR+ obtained by the VLIW processor 100 indicates the AND of the first comparison result CMP1 and the execution result PR.

Pattern D(2) represents the VLIW instruction "COMPARE1_OR" in which the first synthesis designation CMB1 corresponding to the first compare instruction COMPARE1 indicates "OR".

In the case of Pattern D(2), the execution result PR+ obtained by the VLIW processor 100 indicates the OR of the first comparison result CMP1 and the execution result PR.

Pattern D(3) represents the VLIW instruction "COMPARE1" in which the field of the first synthesis designation CMB1 corresponding to the first compare instruction COMPARE1 is empty.

In the case of Pattern D(3), the execution result PR+ obtained by the VLIW processor 100 indicates the first comparison result CMP1.

That is, in the case of the instruction of Pattern D, the VLIW processor 100 can execute one compare instruction in one cycle.

An example of the implementation in the VLIW processor 100 will now be described. Note that in the following description, the third synthesis designation CMB3 indicating "AND" is represented by "Fand" and the third synthesis designation CMB3 indicating "OR" is represented by "For" in specific program examples, for ease of explanation. In program examples, one line indicates processing in one cycle.

Figure 14:
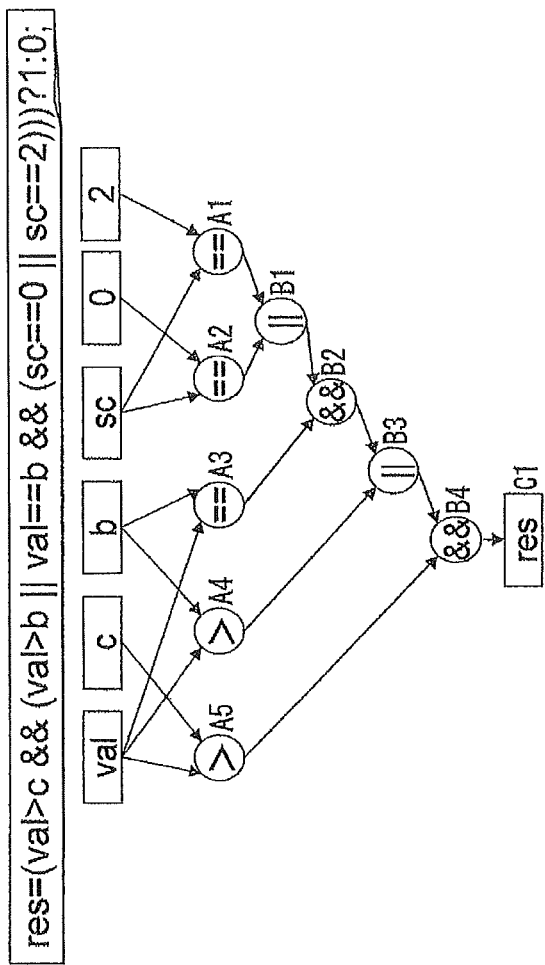
FIG. 14 is a diagram illustrating an example of dividing processing in the case of implementing the processing shown in Expression (1) in the VLIW processor illustrated in FIG. 6.

As illustrated in FIG. 14, the processing shown in Expression (1) can be divided into five comparison operations A1 to A5, four logical operations B1 to B4, and C1 for setting the processing result. According to the VLIW instruction and the VLIW processor 100 of this embodiment, it is possible to execute, in one cycle, two compare instructions in parallel, logical operations between the results of comparisons indicated by the compare instructions and the preceding execution result PR (the processing result in the preceding line, from the viewpoint of program), and a logical operation of the two logical operations. Accordingly, the processing shown in Expression (1) can be divided as illustrated in FIG. 14 and can be implemented in the VLIW processor 100 without using any branch instruction.

Figure 15:
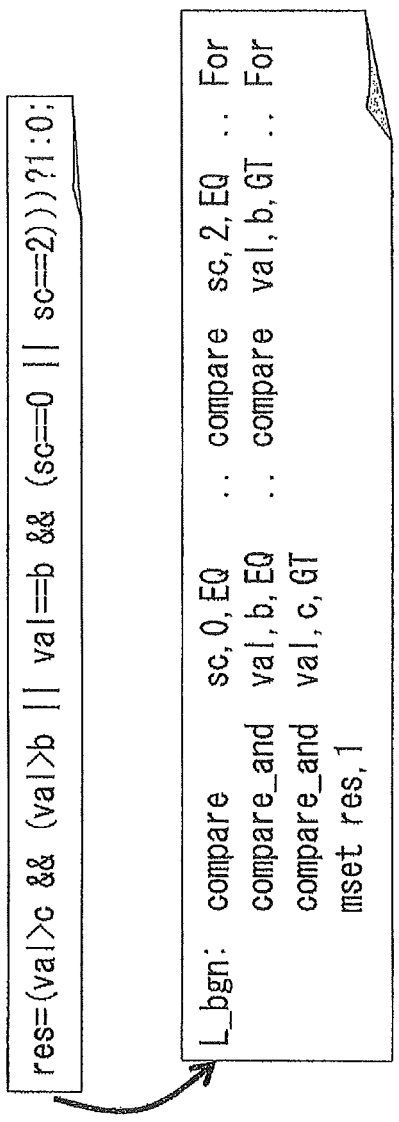
FIG. 15 is a diagram illustrating an example of program for use in implementing the processing shown in Expression (1) in the VLIW processor illustrated in FIG. 6.

FIG. 15 illustrates an example of a program for use in implementing the processing shown in Expression (1) in the VLIW processor 100.

A first line of the program represents processing in which a first comparison "SC==0" and a second comparison "SC==2" are executed in parallel; an OR operation between two comparison results is performed; and the result of the OR operation is stored in the predicate register 160. The first line of the program also indicates that two instructions "compare" represent the first compare instruction and the second compare instruction and that the fields of the first synthesis designation CMB1 and the second synthesis designation CMB2 are empty, which indicates "not to synthesize". This processing corresponds to the processing of Pattern C(2) illustrated in FIG. 12.

A second line of the program represents processing in which a first comparison "val==b" and a second comparison "val>b" are executed in parallel, and the OR of the second comparison result and the AND of the first comparison result and the execution result of the first line (the value of the predicate register 160) is obtained and stored in the predicate register 160. This processing corresponds to the processing of Pattern B(1) illustrated in FIG. 11.

A third line of the program represents processing in which a first comparison (val>c) is executed and the AND of the first comparison result and the execution result of the second line is obtained and stored in the predicate register 160. This processing corresponds to the processing of Pattern D(1) illustrated in FIG. 13.

A fourth line of the program represents processing for executing an instruction "mset" indicating that "1" is stored as the argument res according to the value of the predicate register 160.

In this manner, the VLIW processor 100 of this embodiment can complete the processing shown in Expression (1) in four cycles.

As described above, in the case of implementing the processing shown in Expression (1) in the VLIW processor of the related art according to branch instructions, nine cycles are required when the branch penalty is two cycles (FIG. 18).

Figure 16:
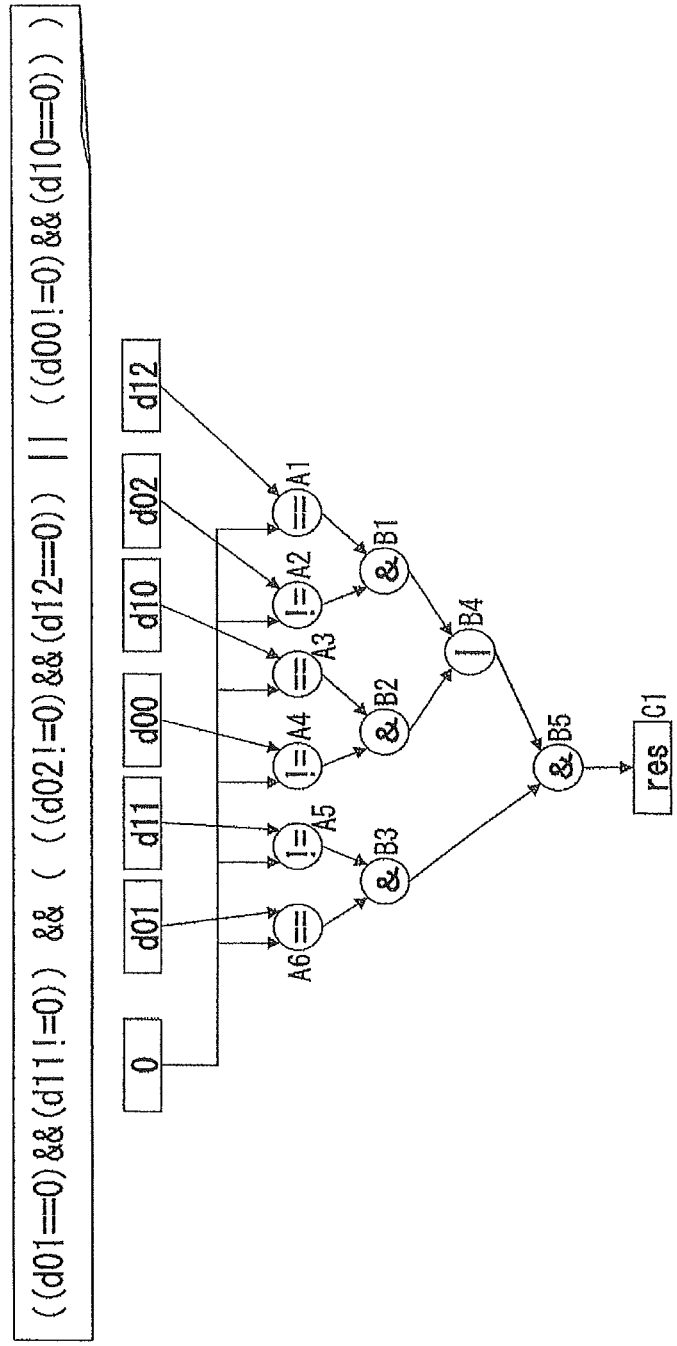
FIG. 16 is a diagram illustrating an example of dividing processing in the case of implementing the processing shown in Expression (2) in the VLIW processor illustrated in FIG. 6.

FIG. 16 illustrates a mode in which the processing shown in Expression (2) is divided. As illustrated in FIG. 16, the processing shown in Expression (2) can be divided into six comparison operations A1 to A6, five logical operations B1 to B5, and processing C1 for setting the processing result.

FIG. 17 illustrates an example of a program when the processing shown in Expression (2) is divided as illustrated in FIG. 16 and implemented in the VLIW processor 100.

The first line of the program represents processing in which a first comparison "d02≠0" and a second comparison "d12=0" are executed in parallel; an AND operation is performed on two comparison results; and the AND operation result is stored in the predicate register 160. This processing corresponds to the processing of Pattern C(1) illustrated in FIG. 12.

The second line of the program represents processing in which a first comparison "d00≠0" and a second comparison "d10=0" are executed in parallel, and the AND between the OR of the first comparison result and the execution result of the first line and the OR of the second comparison result and the execution result of the first line is obtained and stored in the predicate register 160. This processing corresponds to the processing of Pattern A(4) illustrated in FIG. 10.

The third line of the program represents processing in which a first comparison(d11≠0) and a second comparison (d01=0) are executed in parallel, and the AND between the AND of the first comparison result and the execution result of the second line and the AND of the second comparison result and the execution result of the second line is obtained and stored in the predicate register 160. This processing corresponds to the processing of Pattern A(1) illustrated in FIG. 10.

The fourth line of the program represents processing for executing the instruction "mset" indicating that "1" is stored as the argument res according to the value of the predicate register 160.

In this manner, the VLIW processor 100 of this embodiment can complete the processing shown in Expression (2) in four cycles.

As described above, in the case of executing the processing shown in Expression (2) in the VLIW processor of the related art according to branch instructions, 12 cycles are required when the branch penalty is two cycles (FIG. 19).

In this manner, the VLIW processor 100 of this embodiment can efficiently perform the conditional judgment processing including a plurality of comparison processings.

As a result of causing the VLIW processor 100 to execute the conditional judgment processing in edge detection processing for images, the present inventor(s) has(have) confirmed that a speed about twice as high as that of a typical VLIW processor is obtained.

The present invention has been described above with reference to embodiments. The embodiments are illustrated by way of example only, and various alterations, additions, omissions, and combinations can be made on the embodiments described above without departing from the gist of the present invention. It is understood by those skilled in the art that modified examples including these alterations, additions, omissions, and combinations also fall within the scope of the present invention.

For example, in the VLIW processor 100, the predicate register 160 is used as a register for holding the latest execution result PR+. A typical predicate register has one bit, and a general-purpose register has 16 bits or 32 bits. In the VLIW processor 100, the execution result of the VLIW instruction is one bit. Accordingly, the use of the predicate register 160 further suppresses the circuit size. A general-purpose register may also be used as the register for holding the latest execution result PR+.

In the case of executing only one compare instruction as described above, for example, the field of the third synthesis designation CMB3 may be empty. In this case, the third synthesis designation field may be used for different applications such as an immediate field for other instructions, instead of leaving the third synthesis designation field empty.

Further, the scope of the claims is not limited by the embodiments described above.

Furthermore, it is noted that, Applicant's intent is to encompass equivalents of all claim elements, even if amended later during prosecution.

What is claimed is:

1. A processor, comprising:
a first comparison operation unit;
a second comparison operation unit;
a first operation unit;
a second operation unit;
a third operation unit; and
a register, wherein
the first comparison operation unit receives a first comparison operation signal, a first input signal, and a second input signal, performs a comparison operation indicated by the first comparison operation signal on the first input signal and the second input signal, and outputs a result of the comparison operation,
the second comparison operation unit receives a second comparison operation signal, a third input signal, and a fourth input signal, performs a comparison operation indicated by the second comparison operation signal on the third input signal and the fourth input signal, and outputs a result of the comparison operation,
the first operation unit receives the comparison result of the first comparison operation unit, and a value already held in the register, and outputs, as a first operation result, one of the comparison result of the first comparison operation unit, a first logical operation of the comparison result of the first comparison operation unit and the value of the register, and a second logical operation of the comparison result of the first comparison operation unit and the value of the register,
the second operation unit receives the comparison result of the second comparison operation unit, and a value already held in the register, and outputs, as a second operation result, one of the comparison result of the second comparison operation unit, a first logical operation of the comparison result of the second comparison operation unit and the value of the register, and a second logical operation of the comparison result of the second comparison operation unit and the value of the register,
the third operation unit receives the first operation result and the second operation result, and outputs, as an execution result, one of the first operation result, a first logical operation of the first operation result and the second operation result, and a second logical operation of the first operation result and the second operation result to the register, and
the register newly holds and outputs the execution result received from the third operation unit.

2. The processor according to claim 1, wherein the first logical operation comprises an AND operation, and the second logical operation comprises an OR operation,
further comprising a control unit that executes one instruction including a first compare instruction, a first synthesis designation, a second compare instruction, a second synthesis designation, and a third synthesis designation, the first synthesis designation corresponding to the first compare instruction and indicating one of "not to synthesize", "AND", and "OR", the second synthesis designation corresponding to the second compare instruction and indicating one of "not to synthesize", "AND", and "OR", the third synthesis designation indicating one of "AND" and "OR".

3. The processor according to claim 2, wherein
the control unit outputs signals as the first comparison operation signal, the first input signal, and the second input signal, respectively, to the first comparison operation unit, the signals respectively indicating a comparison operator and two input operands included in the first compare instruction, and
the control unit outputs signals as the second comparison operation signal, the third input signal, and the fourth input signal, respectively, to the second comparison operation unit, the signals respectively indicating a comparison operator and two input operands included in the second compare instruction.

4. The processor according to claim 3, wherein, when the second compare instruction is empty or when the third synthesis designation is empty, the control unit outputs, to the first comparison operation unit, the first comparison operation signal corresponding to the first compare instruction, the first input signal, and the second input signal, and outputs, to the third operation unit, a signal indicating that the first operation result is output as the execution result.

5. The processor according to claim 1, wherein the first logical operation comprises an AND operation, and the second logical operation comprises an OR operation, and wherein
the first operation unit comprises:
a first AND gate and a first OR gate, each of the first AND gate and the first OR gate being configured to receive the comparison result of the first comparison operation unit and a value already held in the register; and
a first selector that receives the comparison result of the first comparison operation unit, an output of the first AND gate, and an output of the first OR gate, and
the first selector selects one of three inputs as the first operation result, and outputs the selected input.

6. The processor according to claim 1, wherein the first logical operation comprises an AND operation, and the second logical operation comprises an OR operation, and wherein
the second operation unit comprises:
a second AND gate and a second OR gate, each of the second AND gate and the second OR gate being configured to receive the comparison result of the second comparison operation unit and a value already held in the register; and
a second selector that receives the comparison result of the second comparison operation unit, an output of the second AND gate, and an output of the second OR gate, and
the second selector selects one of three inputs as the second operation result, and outputs the selected input.

7. The processor according to claim 1, wherein the first logical operation comprises an AND operation, and the second logical operation comprises an OR operation, and wherein
the third operation unit comprises:
a third AND gate and a third OR gate, each of the third AND gate and the third OR gate being configured to receive the first operation result and the second operation result; and a third selector that receives the first operation result, an output of the third AND gate, and an output of the third OR gate, and
the third selector selects one of three inputs as the execution result, and outputs the selected input.

8. The processor according to claim 1, wherein the register comprises a predicate register.

9. The processor according to claim 1, wherein the first logical operation comprises an AND operation.

10. The processor according to claim 1, wherein the second logical operation comprises an OR operation.

11. An instruction structure of an instruction, comprising:
a first compare instruction field that stores a first compare instruction;
a first synthesis designation field that stores a first synthesis designation;
a second compare instruction field that stores a second compare instruction;
a second synthesis designation field that stores a second synthesis designation; and
a third synthesis designation field that stores a third synthesis designation,
the first synthesis designation indicates, as a first operation result, one of a result of a comparison indicated by the first compare instruction, a first logical operation of the result of the comparison and an execution result of a preceding instruction, and a second logical operation of the result of the comparison and the execution result of the preceding instruction,
the second synthesis designation indicates, as a second operation result, one of a result of a comparison indicated by the second compare instruction, a first logical operation of the result of the comparison and the execution result of the preceding instruction, and a second logical operation of the result of the comparison and the execution result of the preceding instruction, and
the third synthesis designation indicates, as an execution result of a current instruction, one of the first operation result, a first logical operation of the first operation result and the second operation result, and a second logical operation of the first operation result and the second operation result.

12. The instruction structure according to claim 11, wherein, when one of the second compare instruction field and the third synthesis designation field is empty, the empty field indicates that the first operation result is output as the execution result of the current instruction.

13. The instruction structure according to claim 11, wherein the first logical operation comprises an AND operation.

14. The instruction structure according to claim 11, wherein the second logical operation comprises an OR operation.

15. The instruction structure according to claim 11, wherein the first logical operation comprises an AND operation, and the second logical operation comprises an OR operation.

16. A method for executing an instruction in a processor, the processor comprising a register and configured to receive an instruction including a first compare instruction, a second compare instruction, and three synthesis designations including first and second synthesis designations each indicating one of "not to synthesize", "a first logical operation", and "a second logical operation", and a third synthesis designation indicating one of "a first logical operation" and "a second logical operation", the method comprising:

outputting, as a first operation result, a result of a comparison indicated by the first compare instruction when the first synthesis designation indicates "not to synthesize", and in other cases, outputting, as the first operation result, a value obtained by performing a logical operation indicated by the first synthesis designation on the result of the comparison indicated by the first compare instruction and a value already held in the register;

outputting, as a second operation result, a result of a comparison indicated by the second compare instruction when the second synthesis designation indicates "not to synthesize", and in other cases, outputting, as the second operation result, a value obtained by performing a logical operation indicated by the second synthesis designation on the result of the comparison indicated by the second compare instruction and a value already held in the register;

outputting, as an execution result of a current instruction, a value obtained by performing a logical operation indicated by the third synthesis designation on the first operation result and the second operation result, to the register; and newly holding and outputting, by the register, the execution result.

17. The execution method according to claim 16, wherein, when one of the second compare instruction and the third synthesis designation is empty, the first operation result is output to the register as the execution result of the current instruction.

18. The execution method according to claim 16, wherein the first logical operation comprises an AND operation.

19. The execution method according to claim 16, wherein the second logical operation comprises an OR operation.

20. The execution method according to claim 16, wherein the first logical operation comprises an AND operation, and the second logical operation comprises an OR operation.

* * * * *